US012743782B2

(12) United States Patent
Maldonado Tavara et al.

(10) Patent No.: US 12,743,782 B2
(45) Date of Patent: Sep. 22, 2026

(54) ROCK IMAGE ANALYSIS USING THREE-DIMENSIONAL SEGMENTATION

(71) Applicant: Halliburton Energy Services, Inc., Houston, TX (US)

(72) Inventors: Edwin German Maldonado Tavara, Rio de Janeiro (BR); Radompon Sungkorn, Katy, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 273 days.

(21) Appl. No.: 18/403,161

(22) Filed: Jan. 3, 2024

(65) Prior Publication Data

US 2025/0217991 A1 Jul. 3, 2025

(51) Int. Cl.

| | |
|---|---|
| ***G06T 7/11*** | (2017.01) |
| ***G06T 3/4007*** | (2024.01) |
| ***G06T 7/40*** | (2017.01) |
| ***G06T 7/60*** | (2017.01) |
| ***G06V 10/54*** | (2022.01) |
| ***G06V 10/762*** | (2022.01) |
| ***G06V 20/60*** | (2022.01) |

(52) U.S. Cl.

CPC ............. *G06T 7/11* (2017.01); *G06T 3/4007* (2013.01); *G06T 7/40* (2013.01); *G06T 7/60* (2013.01); *G06V 10/54* (2022.01); *G06V 10/762* (2022.01); *G06V 20/60* (2022.01); *G06T 2200/04* (2013.01); *G06T 2207/20021* (2013.01)

(58) Field of Classification Search

None

See application file for complete search history.

(56) References Cited

U.S. PATENT DOCUMENTS

| | | | |
|---|---|---|---|
| 10,198,804 | B2 | 2/2019 | Sungkorn et al. |
| 2010/0198638 | A1 | 8/2010 | Deffenbaugh et al. |
| 2019/0195061 | A1 | 6/2019 | Ramsay et al. |
| 2020/0132872 | A1 | 4/2020 | Dossary et al. |

(Continued)

OTHER PUBLICATIONS

Atrash and Velledits, “CT Based Analysis of Pore Network of Reservoir Rocks” (Year: 2020).*

(Continued)

*Primary Examiner* — Chan S Park
*Assistant Examiner* — Promotto Tajrian Islam
(74) *Attorney, Agent, or Firm* — NOVAK DRUCE CARROLL LLP

(57) ABSTRACT

Systems and methods are provided for determining fabrics of a geological sample using three-dimensional segmentation. An example method can include receiving three-dimensional (3D) image of a geological sample, adjusting an initial size of the 3D image of the geological sample, and partitioning the resized 3D image of the geological sample into cubes. The example method can include, for each cube, generating orthogonal planes based on a center of mass of each cube and extracting, for the orthogonal planes associated with each cube, one or more features to represent texture of the geological sample. The example method can further include grouping the cubes into one or more clusters based on the one or more features and constructing a volume of the resized 3D image of the geological sample based on the one or more clusters for a texture analysis of the geological sample.

20 Claims, 8 Drawing Sheets

(56) References Cited

U.S. PATENT DOCUMENTS

2021/0063325 A1 3/2021 Drenzek
2023/0236333 A1* 7/2023 Faber .................... G01V 1/164
367/178

OTHER PUBLICATIONS

Wang et al., Super Resolution Convolutional Neural Network Models for Enhancing Resolution of Rock Micro-CT Images, DOI: https://doi.org/10.48550/arXiv.1904.07470 (Year: 2019).*
Pérez-García et al., "TorchIO: A Python library for efficient loading, preprocessing, augmentation and patch-based sampling of medical images in deep learning", DOI: https://doi.org/10.1016/j.cmpb.2021.106236 (Year: 2021).*
MATLAB, imremsize documentation (Year: 2023).*
TorchIO, GridSampler documentation (Year: 2021).*
MATLAB, Texture Analysis Using the Gray-Level Co-Occurrence Matrix (GLCM) (Year: 2023).*
Li et al., "Automatic Characterization of Rock Mass Discontinuities using 3D Point Clouds", DOI: 10.1016/j.enggeo.2019.05.008Get rights and content, Publication Year: 2019) (Year: 2019).*
International Search Report & Written Opinion; PCT Application No. PCT/US2024/010298; mailed Sep. 30, 2024.
Abstract of Hasan et al., CT Based Analysis of Pore Network of Reservoir Rocks. Geosciences and Engineering: a Publication of the University of Miskolc. Sep. 2020, vol. 8, No. 13, pp. 167-184.
Miarelli, Marco et al., "Workflow Development to Scale up Petrophysical Properties from Digital Rock Physics Scale to Laboratory Scale", Published online: Oct. 4, 2021.

* cited by examiner

ROCK IMAGE ANALYSIS USING THREE-DIMENSIONAL SEGMENTATION

TECHNICAL FIELD

The present disclosure generally relates to rock image analysis using three-dimensional segmentation. For example, aspects of the present disclosure relate to a machine learning-based workflow for the three-dimensional segmentation of fabrics in rock images.

BACKGROUND

Wells can be drilled to access and produce hydrocarbons such as oil and gas from subterranean geological formations. Wellbore operations can include drilling operations, completion operations, fracturing operations, and production operations. Drilling operations may involve gathering information related to downhole geological formations of the wellbore. The information may be collected by wireline logging, logging while drilling (LWD), measurement while drilling (MWD), drill pipe conveyed logging, or coil tubing conveyed logging. For example, nuclear magnetic resonance ("NMR") tools have been used to explore the subsurface based on the magnetic interactions with subsurface material in the field of logging.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
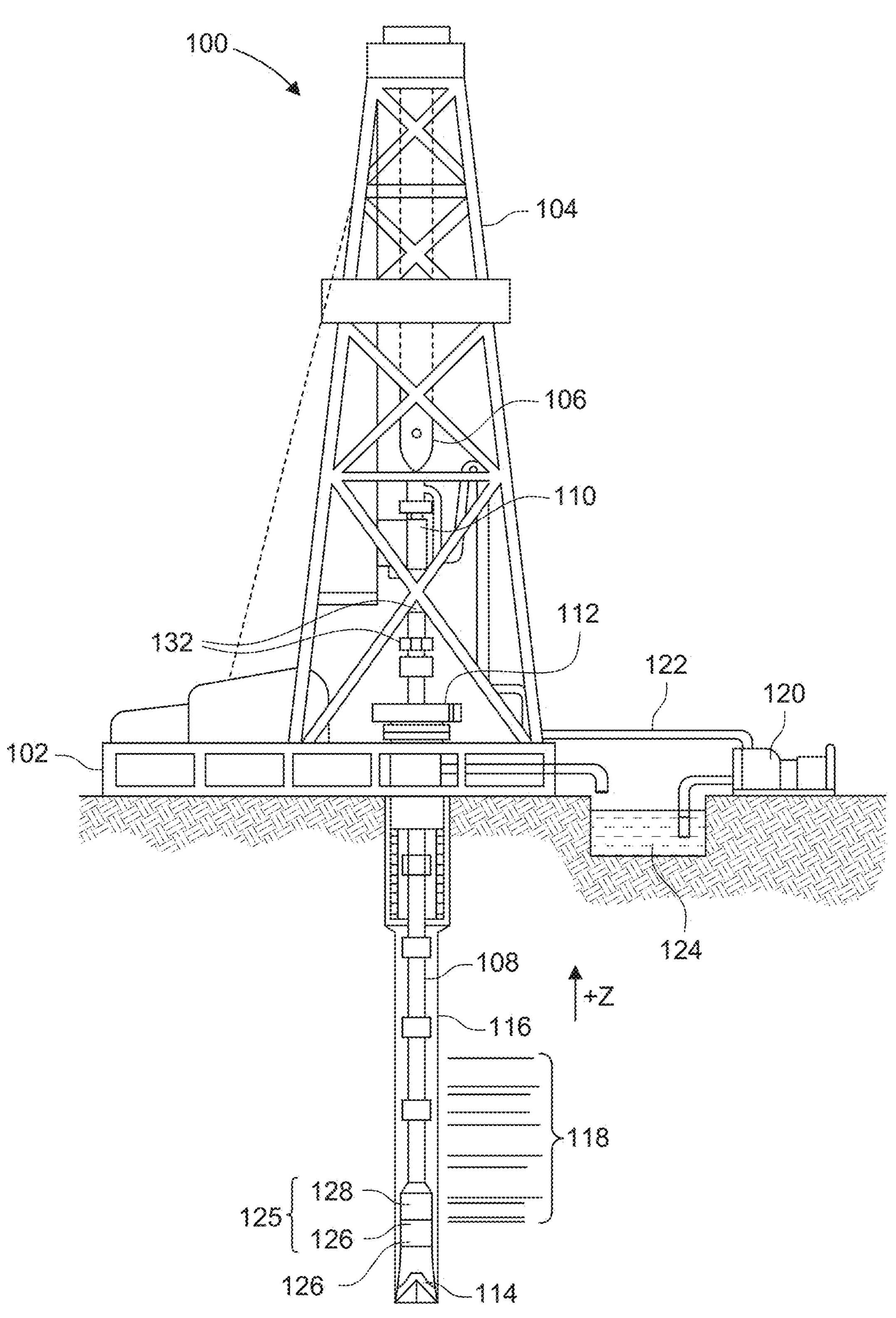
FIG. 1A is a schematic side-view of an example wireline logging environment, according to some examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Rock fabrics refer to physical characteristics of rocks such as the distinct arrangement, texture, and composition of mineral grains, crystals, or other components within a rock. Variations in fabrics may lead to differences in petrophysical properties such as permeability, wettability, and elastics, which can significantly influence reservoir characterization. A thorough understanding of the properties of rocks or rock fabric, at minuscule scales such as in micrometers or nanometers can be done using phase segmentation. However, the task of segmenting fabrics can be a protracted and complex process that may require extensive memory usage, time, and effort. Given the extensive number of a rock sample (e.g., a "plug") and the numerous sub-samples derived from plugs, collating all data to characterize a single core can be a time-intensive process. Also, maintaining consistency can be challenging as the results of manual fabric segmentation can be inconsistent, and contingent on an individual performing the task.

Aspects of the present disclosure relate to rock image analysis using three-dimensional (3D) segmentation. In some examples, the present disclosure can determine fabrics of a geological sample (e.g., a rock sample) based on a machine learning-based workflow that includes a 3D segmentation of fabrics in rock images. For example, the present disclosure may receive a 3D image of a geological sample, which be pre-processed (e.g., noise reduction, standardization of the 3D image, etc.). In some examples, the pre-processed 3D image of the geological sample can be resized to a 3D volume that has reduced dimensions while retaining the key attributes of the original 3D image and preserving the original volume representation. For example, the resizing of the 3D image of the geological sample can be based on a interpolation method (e.g., a linear interpolation).

In some aspects, the resized volume of the geological sample may be partitioned into cubes. For each cube, orthogonal planes (e.g., x, y, and z planes) can be generated based on a center of mass of each cube. As follows, distinctive features can be extracted from each orthogonal plane and associated with the respective center of mass of each cube. In some examples, the extracted features can include an angular second moment, a contrast, a dissimilarity, and a homogeneity. Non-limiting examples of features that can be extracted can further include mean, variance, entropy, energy, correlation, and/or a combination thereof. For example, mean, variance, and/or entropy can be assigned to each plane based on first-order histogram. In another example, energy, entropy, contrast, correlation, homogeneity, and/or variance can be assigned to each plane based on grey-level co-occurrence matrix.

The extracted features, as input, can be then fed into a clustering algorithm, which is configured to assign each cube center with a label and output a segmented 3D image of the geological sample. In some approaches, the segmented 3D image of the geological sample can be upscaled to match the original volume. In some cases, isolated elements on the 3D image can be removed through post-processing.

The present disclosure provides a solution for an automatic tool for 3D fabric segmentation. For example, the present disclosure can expedite the 3D fabric segmentation process across different scales of rock images. Further, the present disclosure can improve the accuracy, quality, and/or consistency of reservoir characterization (e.g., structural representation of fabrics), especially in a 3D space. For example, instead of resizing the 3D volume (e.g., 3D image of a geological sample) for keypoint extraction and subsequently discarding the resized volume, the present disclosure may perform fabric segmentation on the resized image and later upscale the segmentation to its original dimensions. As follows, the present disclosure can reduce and/or minimize processing time and reduce manual labor requirements and memory usage in rock image analysis.

Examples of the systems and techniques described herein are illustrated in FIG. 1A through FIG. 7 and described below.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the both drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission. e.g., using mud pulse telemetry, EM telemetry, or acoustic telemetry. In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
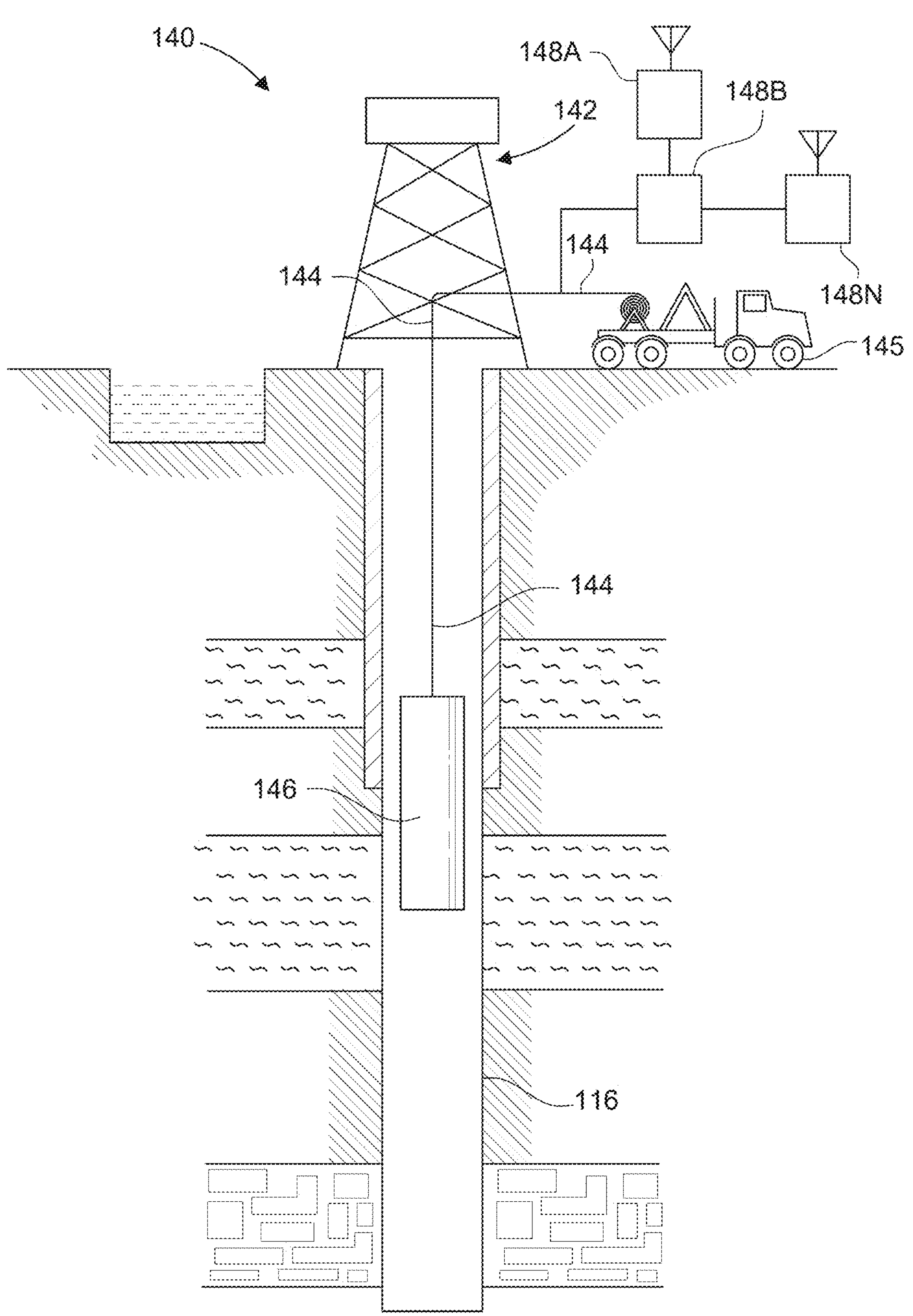
FIG. 1B is a schematic side-view of the example logging environment of FIG. 1A, according to some examples of the present disclosure.

Referring to FIG. 1B, an example system 140 is depicted for conducting downhole measurements after at least a portion of a wellbore has been drilled and the drill string removed from the well. A downhole tool can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Although FIGS. 1A and 1B depict specific borehole configurations, it should be understood that the present disclosure is suited for use in wellbores having other orientations including vertical wellbores, horizontal wellbores, slanted wellbores, multilateral wellbores, and the like. While FIGS. 1A and 1B depict an onshore operation, it should also be understood that the present disclosure is suited for use in offshore operations. Moreover, the present disclosure is not limited to the environments depicted in FIGS. 1A and 1B, and can also be used in other well operations such as, for example and without limitation, production tubing operations, jointed tubing operations, coiled tubing operations, combinations thereof, and/or the like.

Figure 2:
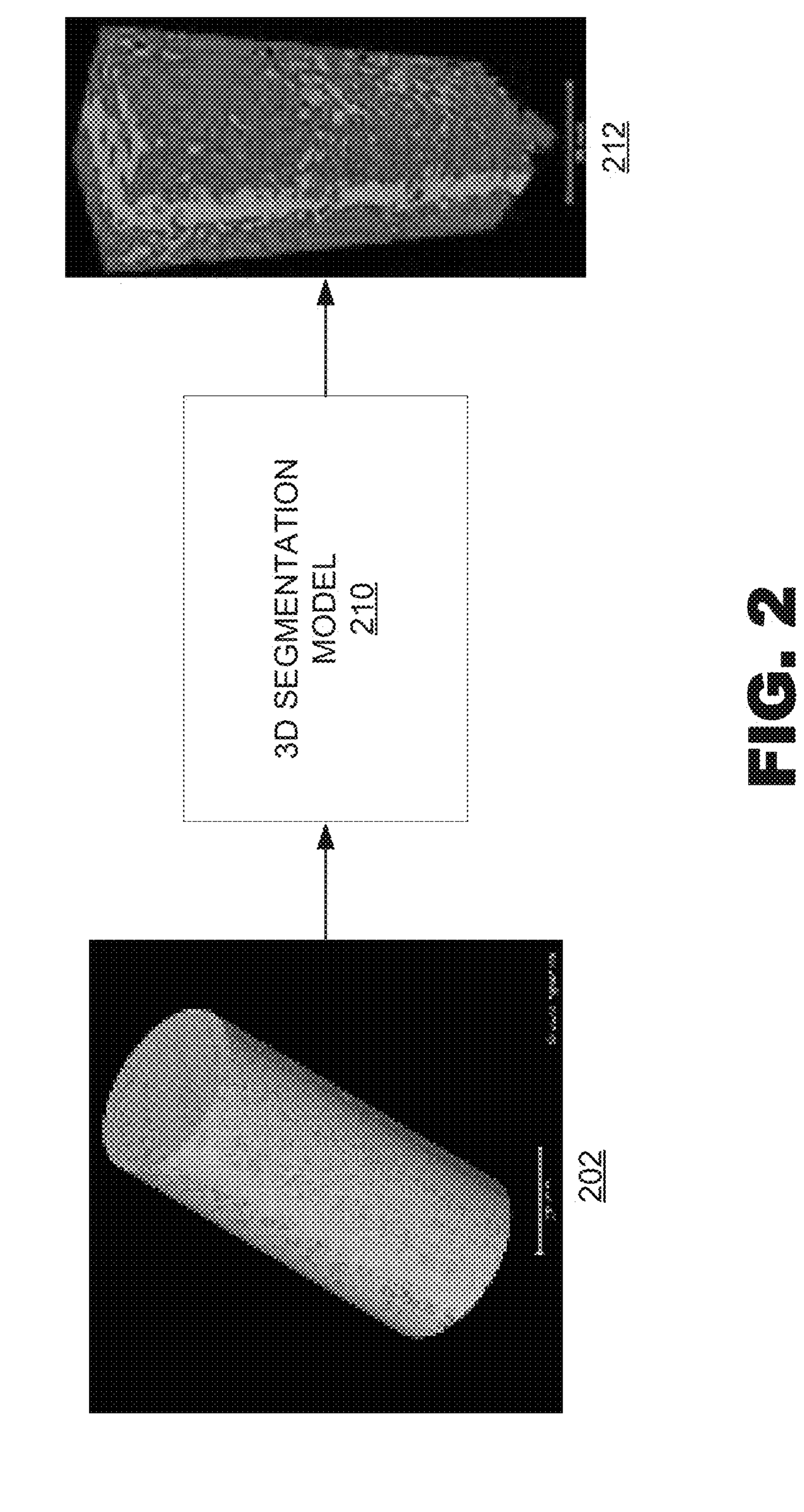
FIG. 2 illustrates an example system for rock image analysis using a three-dimensional segmentation model, in accordance with aspects of the present disclosure.

FIG. 2 illustrates an example rock image analysis system 200 using a three-dimensional segmentation model. In some examples, system 200 can include 3D segmentation model 210. In some cases, 3D segmentation model 210 can be implemented as part of system 140 as illustrated in FIG. 1B (e.g., one or more of processors 148A-N). In some examples, 3D segmentation model 210 can be configured to implement algorithms, processes, machine learning models, etc. that can be used to analyze and/or determine fabrics of a geological sample (e.g., a rock sample). For example, in some cases, 3D segmentation model 210 may include an image processing algorithm, a texture analysis algorithm (e.g., Gray-Level Co-occurrence Matrix (GLCM), Gabor filter, Discrete Wavelet Transform (DWT), Local Binary Patterns (LBP), etc.), a clusterization algorithm (e.g., K-means, Gaussian Mixture Models (GMM), Mean Shift Clustering, Balanced Iterative Reducing and Clustering using Hierarchies (BIRCH), etc.), and so on.

The GLCM can compute statistical measures and characterize the texture of an image (e.g., the texture of an image of a geological sample) by examining the frequency of pixel pairs with specific values at specified spatial relationships, which then allow the extraction of features such as contrast, correlation, energy, and homogeneity and offer a multi-faceted view of texture characteristics. The Gabor filter can analyze spatial frequency content in an image and capture textural variations. The DWT can provide multi-resolution capabilities of wavelets and capture both coarse and fine texture details in an image of a geological sample (e.g., initial 3D image 202 of a rock sample). The LBP can compare each pixel with its neighboring pixels and encode local texture information, making it robust against variations in illumination.

In some examples, initial 3D image 202 of a rock sample can be obtained by processing a rock sample from a downhole (e.g., via a downhole tool as illustrated in FIGS. 1A and 1B, a wireline instrument, a downhole logging tool, etc.). Non-limiting examples of an imaging method for a downhole rock sample can include various 3D imaging modalities such as Micro-Computed Tomography (micro-CT or X-ray) scanning, Computed Tomography (CT) scanning, Focused Ion Beam Scanning Electron Microscopy (FIB-SEM), a scanning electron microscope (SEM), NMR imaging system, a combination thereof, and so on.

As shown, an initial 3D image 202 of a rock sample can be provided to 3D segmentation model 210, which is configured to output a 3D fabric-segmented image 212 of a rock sample. For example, 3D segmentation model 210 can process and/or analyze initial 3D image 202 via various techniques to generate 3D fabric-segmented image 212 of the rock sample. A process/workflow of 3D segmentation model 210 is discussed in detail below with respect to FIG. 3.

Figure 3:
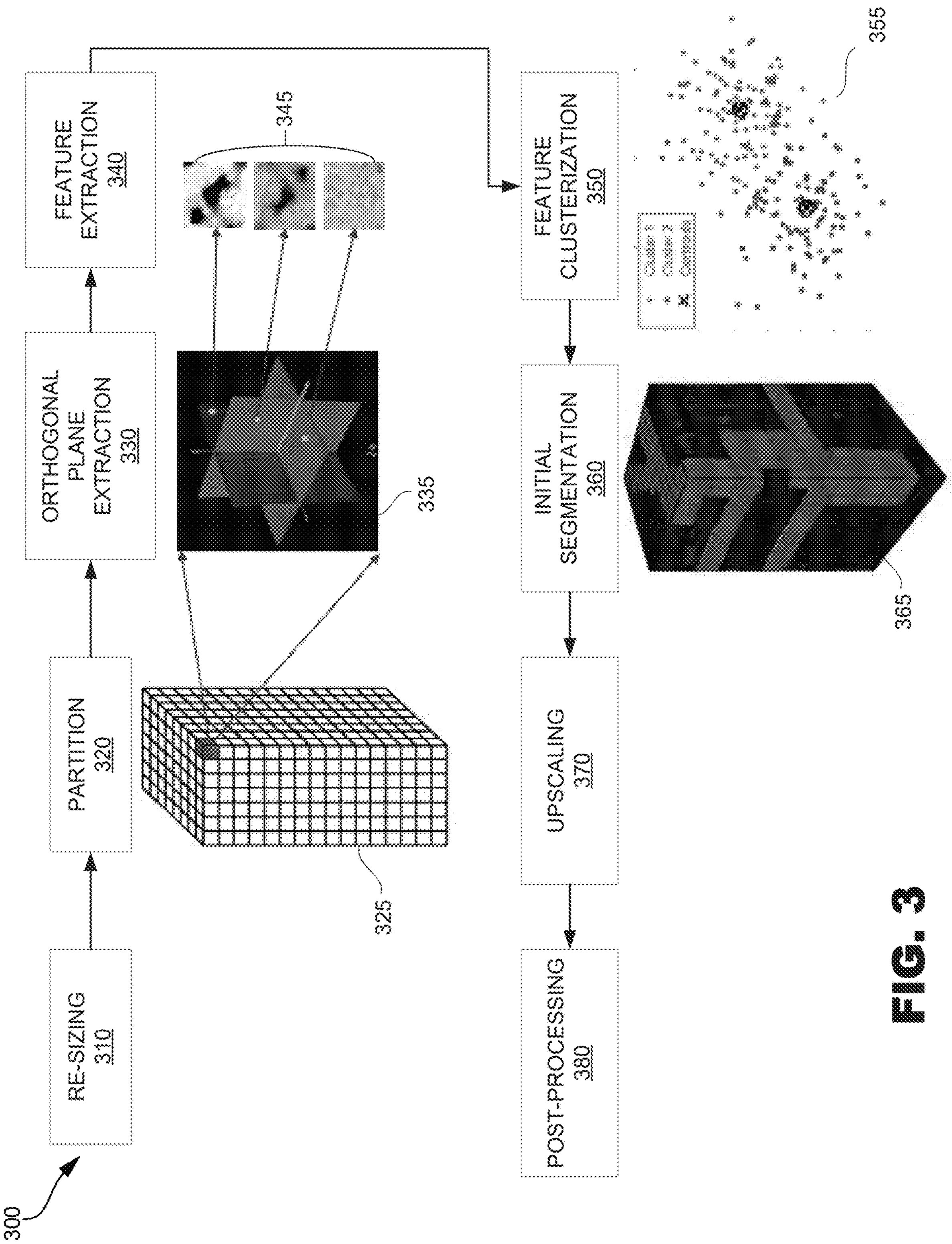
FIG. 3 illustrates an example workflow of rock image analysis using three-dimensional segmentation, according to some aspects of the disclosed technology.

FIG. 3 illustrates an example workflow 300 of rock image analysis using three-dimensional segmentation. As shown, workflow 300 includes various steps such as re-sizing step 310, partition step 320, orthogonal plane extraction step 330, feature extraction step 340, feature clusterization step 350, initial segmentation step 360, upscaling step 370, and/or post-processing step 380. As previously described, the streamlined workflow 300 of the present disclosure can expedite the 3D fabric segmentation process across different scales of rock images and improve the accuracy of reservoir characterization.

Although example workflow 300 depicts a particular sequence of operations, the sequence may be altered without departing from the scope of the present disclosure. For example, some of the operations depicted may be performed in parallel or in a different sequence that does not materially affect the function of workflow 300. In other examples, different components of an example device or system that implements workflow 300 may perform functions at substantially the same time or in a specific sequence.

In some examples, workflow 300 can include an image pre-processing step (not shown). At the image pre-processing step, an initial 3D (volume) image of a rock sample (e.g., initial 3D image 202 illustrated in FIG. 2) can be prepared for re-sizing via pre-processing, which may include, for example without limitation, noise minimization, image feature amplification, and normalization, among others.

At re-sizing step 310, an initial 3D image (or pre-processed 3D image) of a rock sample can be re-sized/downsized to reduce the dimensions of the image. For example, 3D segmentation model 210 can construct a compact representation of initial 3D image 202 with reduced dimensions. In some examples, re-sizing step 310 can include employing a downsizing procedure that leverages an interpolation method (e.g., a linear interpolation, etc.), which may be guided by a resize factor. In some cases, a resize factor can be predetermined based on experimentation. The re-sizing step 310 can provide computational efficiency and preservation of elements/characteristics inherent in the original image, for example, by providing a more manageable 3D volume that retains key attributes of the original volume.

At partition step 320, the re-sized image from re-sizing step 310 may be partitioned into one or more cubes (e.g., centered patches). For example, 3D segmentation model 210 can partition the re-sized 3D (volume) image representative of a rock sample into one or more cubes (e.g., 3D patches). As follows, a systematic array of overlapping cubes can be generated, as shown in partitioned 3D image 325. In other words, the partition step 320 may extract overlapping 3D patches from the resized volume programmatically. The number of cubes can be any applicable number without departing from the scope of the present disclosure.

In some approaches, a windowing technique using a determined stride can be employed over the entirety of the volume of the re-sized image of a rock sample for partitioning. The patch extraction based on a windowing technique can include width-wise movement, height-wise movement, and depth-wise movement. For example, if a parameter for the stride is 5 pixels, the patch extraction can begin at one corner of the 3D volume (e.g., the re-sized 3D volume) and proceed to the width-wise movement where a patch can be slid horizontally (e.g., width direction) by the predetermined stride (e.g., 5 pixels) every time until the patch reaches the other end of the 3D volume. Once the horizontal slide is completed, the patch can be moved upwards (e.g., height direction) by the predetermined stride (e.g., 5 pixels) and the horizontal sliding process can be repeated until the patch reaches the other end. After covering the entire floor of the 3D volume (width and height), the entire width-height sliding process across the depth layer can be repeated. The sliding process across the entire depth of the 3D volume can be continued until the patch reaches the end and the 3D volume is entirely covered (width, height, and depth). Through this process, with every slide, a patch from the 3D volume is extracted.

At orthogonal plane extraction step 330, orthogonal planes (e.g., x, y, z planes) can be generated for each cube. For example, 3D segmentation model 210 can determine a center of mass for every cube, which is generated at partition step 320. For each cube (e.g., 3D patch), 3D segmentation model 210 can generate 2D orthogonal planes/slices representing the axial, sagittal, and coronal planes, as shown in orthogonal planes 335. In some examples, each cube's center of mass can be associated with a set of orthogonal planes (e.g., axial plane, sagittal plane, and coronal plane). Based on the orthogonal planes, 3D contextual information can be collected from each cube.

At feature extraction step 340, one or more features (e.g., attributes) can be extracted from orthogonal planes/slices that are generated at orthogonal plane extraction step 330. For example, 3D segmentation model 210 can extract features from the orthogonal planes associated with each cube's center of mass (e.g., segmentation). In some examples, 3D segmentation model 210 can extract one or more features, using a model, that may quantitatively represent texture. For example, feature extraction step 340 can include utilizing a texture analysis method such as grey-level co-occurrence matrix (GLCM). For example, GLCM can capture the spatial relationships between pixel intensities within the 3D image. The features that may be extracted at feature extraction step 340 can include, for example and without limitation, angular second moment (ASM), contrast, dissimilarity, and homogeneity. As follows, each cube's center of mass can be characterized by the features (e.g., extracted features 345) that may quantitatively represent the texture (e.g., fabrics). The extracted features can be provided as input for the subsequent feature clusterization step 350.

At feature clusterization step 350, the features extracted at feature extraction step 340 can be provided to a clustering algorithm, which is configured to assign a label for each cube's center of mass. The extracted features can be analyzed for feature classification, which may define cluster(s) corresponding to a texture. For example, 3D segmentation model 210 can include a clustering algorithm, which may receive as input, the feature harvested at feature extraction step 340, combined with the predetermined number of clusters, and assign each cube's center of mass with a label (e.g., cluster 1 and cluster 2, as illustrated in a set of clusters 355). As follows, the features of each cube can be categorized/clustered into groups of cubes with similar features (or feature values). Further, the feature clusterization step 350 may identify distinct rock fabrics based on the feature clusterization. In some examples, a desired number of clusters or labels can be specified by a user. In some aspects, a machine learning model (e.g., 3D segmentation model 210) can learn data and find an appropriate number of clusters.

At initial segmentation step 360, each label that is assigned at feature clusterization step 350 may be propagated to its respective cube (e.g., extended to cover the entire cube) to construct a volume based on the feature clusters. For example, 3D segmentation model 210 can propagate each label to its respective cube, resulting in initial segmented 3D image 365. Such propagation may be predicated on the assumption that neighboring regions/cubes are likely to exhibit similar textual characteristics. Once overlapping cubes are labeled in a systematic manner at feature clusterization step 350, the initial segmentation step 360 includes examining the regions where cubes overlap. If conflicting labels arise in these overlapping regions, a Marching Cubes method can be used to determine the prevailing label. Notably, labels may be assigned to a batch of pixels concurrently. For example, in an 11×11×11 overlapping cube, 1,331 pixels may be labeled simultaneously, thereby speeding up the process. Additionally, segmentation can be conducted within the resized volume.

At upscaling step 370, initial segmented 3D image 365 can be upscaled to correspond to the original size of an initial 3D image of a rock sample, which is received prior to re-sizing step 310. For example, 3D segmentation model 210 can upsize initial segmented 3D image 365 into a 3D fabric-segmented image (not shown) that has the original size of 3D image of a rock sample (e.g., initial 3D image 202).

In some examples, each voxel in the upscaled image (now shown) may represent a cube in the original image size with a side length equivalent to the resize factor, which is determined in re-sizing step 310. For example, if the resize factor at re-sizing step 310 was set to 3, each voxel in the upscaled image would correspond to a cube consisting of a 3×3×3 voxel grid in the original volume. The upscaling step 370 can provide an accurate and proportionate representation of the segmentation in its original size. In another example, if a resize factor was set to 5 in the re-sizing step 310, each individual voxel within the initial low-resolution 3D volume is transformed into a contiguous 5×5×5 voxel matrix in the resultant higher-resolution volume. Each voxel within the expanded matrix retains the identical scalar value as its antecedent voxel from the original low-resolution dataset, which would ensure consistency in data representation after the upscaling step 370.

Figure 4B:
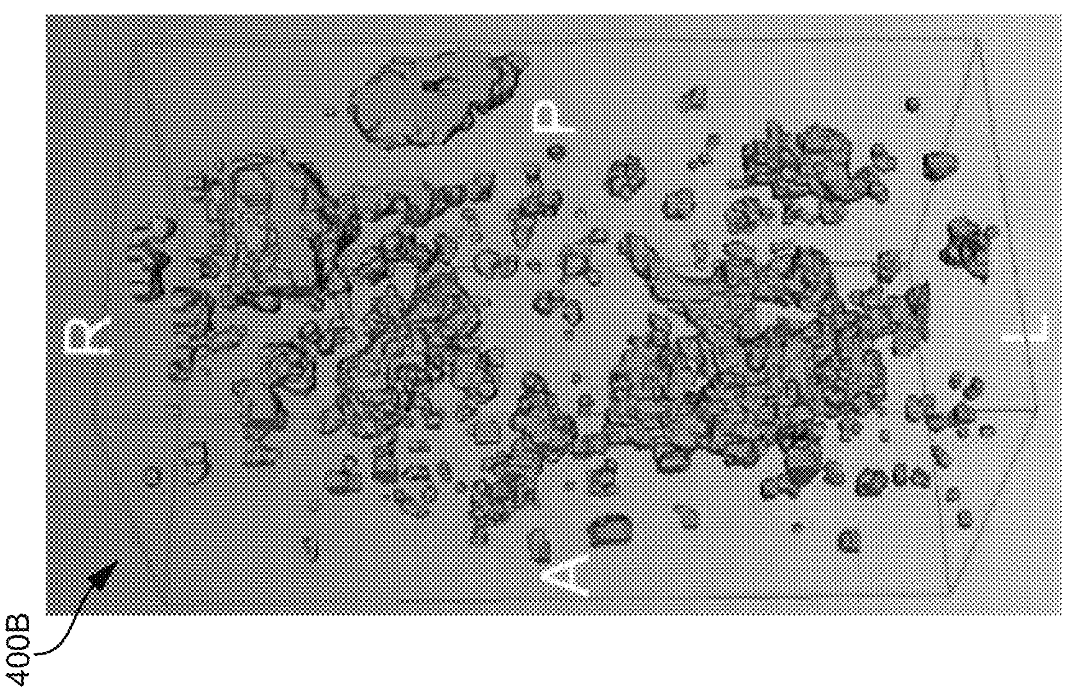
FIG. 4B illustrates an example three-dimensional fabric-segmented image of a geological sample after post-processing, according to some aspects of the disclosed technology.
Figure 4B:
Figure 4A:
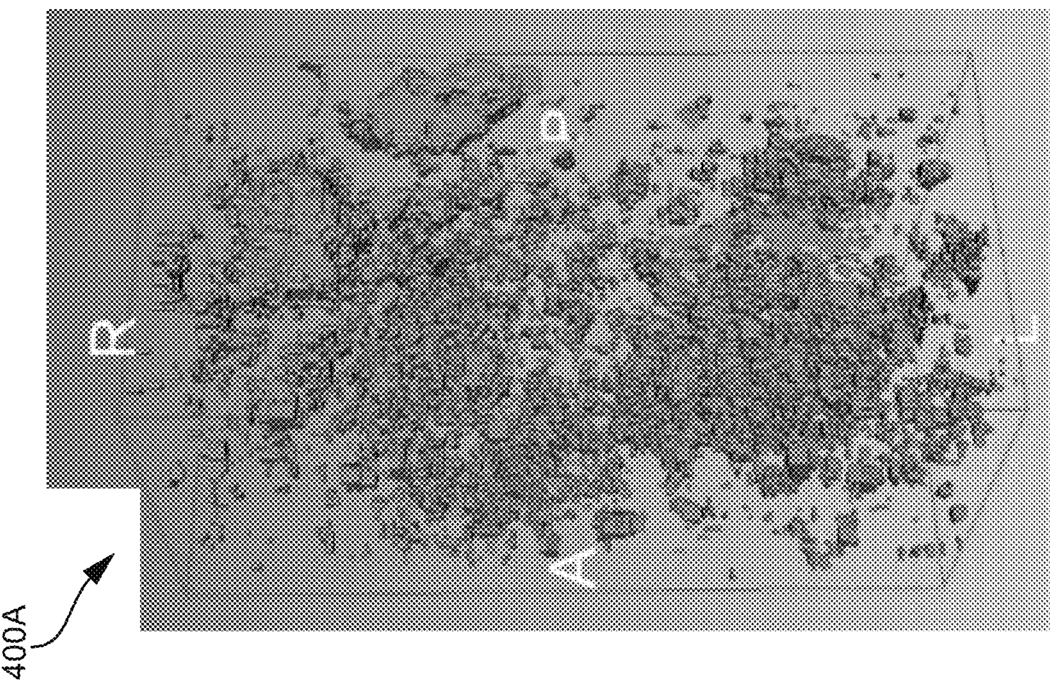
FIG. 4A illustrates an example three-dimensional fabric-segmented image of a geological sample before post-processing, according to some aspects of the disclosed technology.

At post-processing step 380, the segmented volume, which corresponds to the original input dimensions, may undergo further refinement to enhance the smoothness of the segmentation. The 3D segmentation model 210 can process the upscaled image (not shown) for segmentation refining (e.g., eliminating isolated fragments, smoothening edges, etc.). For example, 3D segmentation model 210 may eradicate isolated regions (e.g., islands) and other potential artifacts detrimental to the final segmentation's integrity. Notably, this refinement of post-processing step 380 can operate directly in a 3D space instead of processing individual 2D slices sequentially. For example, the post-processing may directly be performed on the upscaled image, instead of processing the image slice by slice. Referring to FIG. 4A, an example 3D fabric-segmented image 400A of a geological sample prior to post-processing is depicted. FIG. 4B illustrates an example 3D fabric-segmented image 400B of a geological sample after post-processing (e.g., post-processing step 380).

As previously described, the present disclosure can provide a rock image analysis using 3D segmentation as illustrated with respect to FIG. 3 (e.g., workflow 300) that can significantly reduce memory usage and computational time. For example, the present disclosure performs the fabric segmentation on the resized image and subsequently upscales the segmentation back to the original dimensions instead of extracting features from every point in the original 3D volume. Instead of starting with key point extraction and then clustering, the present disclosure includes clustering the entire sample, which therefore leads to reductions of both computation time and memory requirements.

Figure 5:
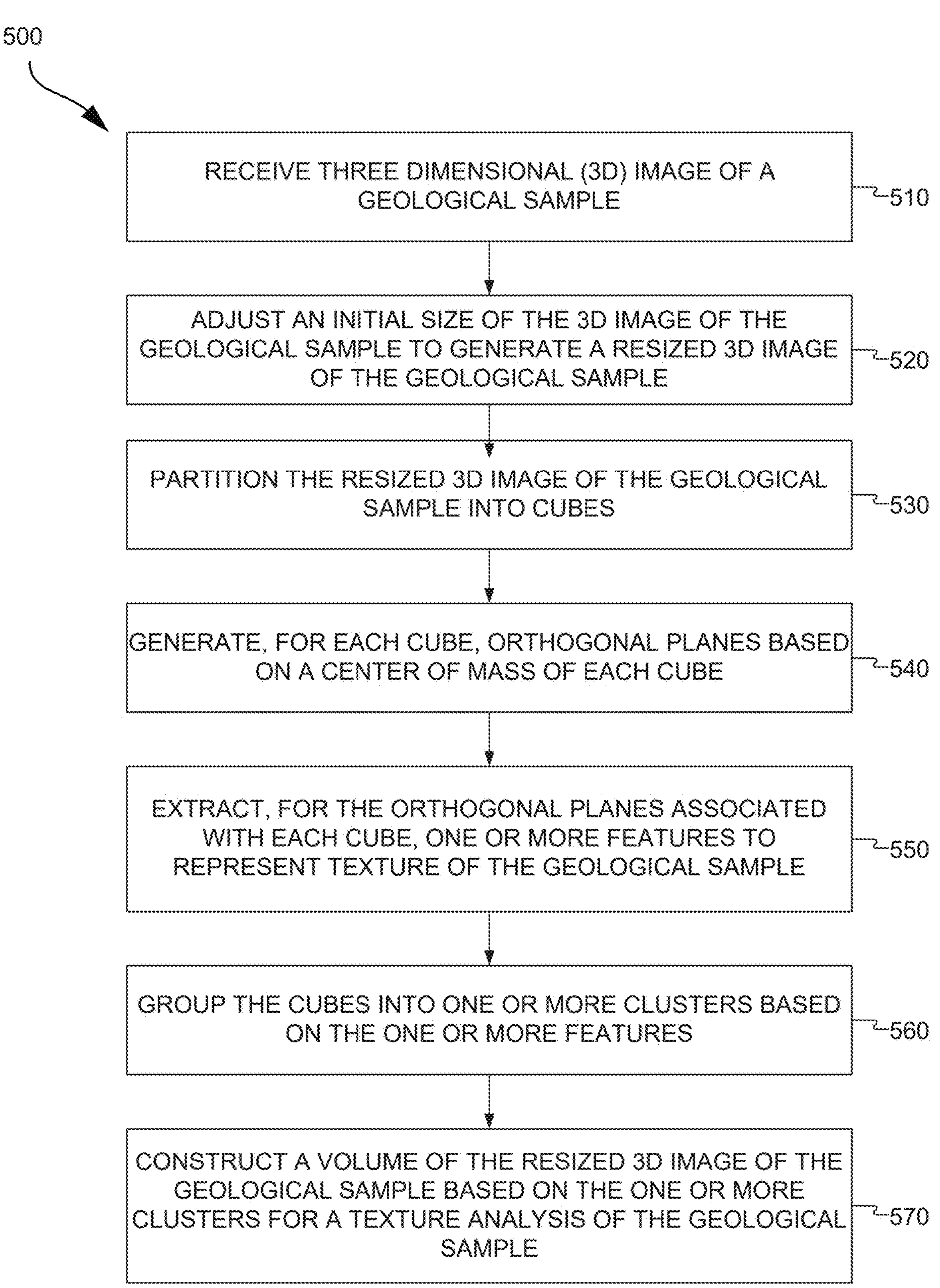
FIG. 5 is a flowchart illustrating an example process for determining fabrics of a geological sample using three-dimensional segmentation, according to some aspects of the disclosed technology.

FIG. 5 is a flowchart illustrating an example process 500 of determining fabrics of a geological sample using three-dimensional segmentation. Although example process 500 depicts a particular sequence of operations, the sequence may be altered without departing from the scope of the present disclosure. For example, some of the operations depicted may be performed in parallel or in a different sequence that does not materially affect the function of process 500. In other examples, different components of an example device or system that implements process 500 may perform functions at substantially the same time or in a specific sequence.

At step 510, process 500 includes receiving a 3D image of a geological sample (e.g., a rock sample). For example, 3D segmentation model 210 can receive a 3D image of a geological sample (e.g., initial 3D image 202 of a rock sample as illustrated in FIG. 2). In some examples, a rock sample can be collected by a downhole tool or any logging tool. As previously described, a 3D imaging method can be used for a rock sample to generate a 3D image of a rock sample. Examples of such imaging method can include CT scanning, micro-CT or X-ray scanning, FIB-SEM, a scanning electron microscope, among others.

At step 520, process 500 can include adjusting an initial size of the 3D image of a geological sample to generate a resized 3D image of the geological sample prior to partitioning the 3D image into the one or more cubes. The resized 3D image of the geological sample has a reduced dimension such that a more manageable 3D volume, while retaining the key attributes of the original volume and preserving the original volume representation, can lead to a reduction in computational time. In some examples, the resizing can be based on an interpolation method (e.g., a linear interpolation) . . . . For example, 3D segmentation model 210 may adjust or downsize the initial size of initial 3D image 202 of a rock sample based on linear interpolation prior to partitioning initial 3D image 202 into cubes to reduce the dimensions of initial 3D image 202.

At step 530, process 500 includes partitioning the 3D image of the geological sample into cubes. For example, 3D segmentation model 210 can partition initial 3D (volume) image 202 of a rock sample (or a re-sized 3D image of a rock sample if the initial size was downsized) into one or more cubes. In some examples, 3D segmentation model 210 may partition initial 3D image 202 or a resized 3D image of a rock sample into one or more cubes, resulting in partitioned 3D image 325 as illustrated in FIG. 3.

In some examples, partitioning of the 3D image of the geological sample can be done based on a sliding window technique using a predetermined stride. For example, 3D segmentation model 210 can perform patch extraction using partitioning based on a sliding window technique. If the 3D volume is a 5×8 pixel image, 3D segmentation model 210 can extract patches using a smaller 3×3 window. Given a stride of one, a 3×3 window can shift one pixel to the right until reaching the end of the row. The 3×3 window then moves to the subsequent row, shifting one pixel downward, and continues the pattern across the entire image. By the end of the process (e.g., after covering width-wise, height-wise, and depth-wise movements), 18 patches can be extracted from the image.

At step 540, process 500 includes generating, for each cube, orthogonal planes based on a center of mass of each cube. For example, 3D segmentation model 210 can generate, for each cube that is generated at step 530, orthogonal planes based on a center of mass of each cube, as shown in orthogonal planes 335. In some cases, the orthogonal planes may comprise a sagittal plane, a coronal plane, and a transversal plane.

At step 550, process 500 includes extracting, for the orthogonal planes associated with each cube, one or more features to represent texture of the geological sample. For example, 3D segmentation model 210 can extract one or more features (e.g., extracted features 345) from orthogonal planes (e.g., orthogonal planes 335), which may include, for example and without limitation, ASM, contrast, dissimilarity, and homogeneity, among others.

At step 560, process 500 includes grouping the cubes into one or more clusters based on the one or more features. For example, 3D segmentation model 210 can include a clustering algorithm, which is configured to receive the features that are extracted at step 550 as input and assign a label (e.g., a cluster) for each cube's center of mass. In some examples, grouping the cubes into one or more clusters can include identifying a pattern using a clustering algorithm based on the one or more features that are extracted for the orthogonal planes associated with each cube.

At step 570, process 500 includes constructing a volume of the 3D image of the geological sample based on the one or more clusters for a texture analysis of the geological sample. For example, 3D segmentation model 210 can propagate each label to its respective cube, resulting in a segmented 3D image (e.g., initial segmented 3D image 365 as illustrated in FIG. 3). Such propagation may be predicated on the assumption that neighboring regions/cubes are likely to exhibit similar textual characteristics.

In some approaches, process 500 can include upscaling the volume of the 3D image of the geological sample to correspond to the initial size of the 3D image of the geological sample. For example, 3D segmentation model 210 can upsize initial segmented 3D image 365 into a 3D fabric-segmented image that has the original size of 3D image of a rock sample (e.g., initial 3D image 202).

In some examples, process 500 can include applying a post-processing operation onto the constructed volume of the 3D image of the geological sample. For example, 3D segmentation model 210 can the upscaled 3D image for segmentation refining. The post-processing can include, for example and limitation, elimination of isolated fragments, smoothening of edges, and so on.

Figure 6:
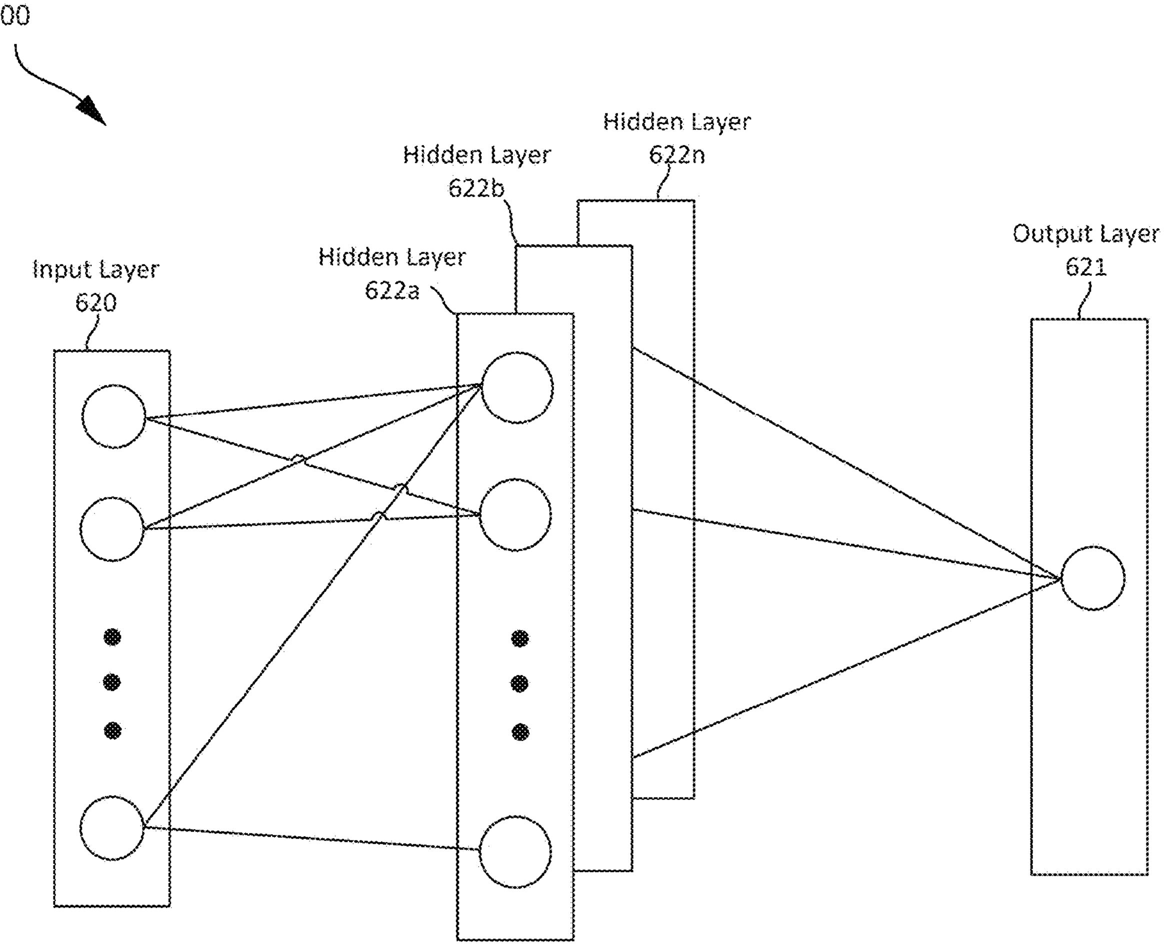
FIG. 6 illustrates an example of a deep learning neural network that can be used in rock image analysis using three-dimensional segmentation, according to some aspects of the disclosed technology.

In FIG. 6, the disclosure now turns to a further discussion of models (e.g., machine learning models as illustrated with respect to FIG. 3) that can be used through the environments and techniques described herein. FIG. 6 is an example of a deep learning neural network 600 that can be used to implement all or a portion of the systems and techniques described herein (e.g., neural network 600 can be used to implement a perception module (or perception system) as discussed above). An input layer 620 can be configured to receive sensor data. The neural network 600 includes multiple hidden layers 622*a*, 622*b*, through 622*n*. The hidden layers 622*a*, 622*b*, through 622*n* include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622*a*, 622*b*, through 622*n*. In one illustrative example, the output layer 621 can provide estimated treatment parameters, that can be used/ingested by a differential simulator to estimate a patient treatment outcome.

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622*a*. For example, as shown, each of the input nodes of the input layer 620 is connected to each of the nodes of the first hidden layer 622*a*. The nodes of the first hidden layer 622*a* can transform the information of each input node by applying activation functions to the input node information. The information derived from the transformation can then be passed to and can activate the nodes of the next hidden layer 622*b*, which can perform their own designated functions. Example functions include convolutional, up-sampling, data transformation, and/or any other suitable functions. The output of the hidden layer 622*b* can then activate nodes of the next hidden layer, and so on. The output of the last hidden layer 622*n* can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622*a*, 622*b*, through 622*n* in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
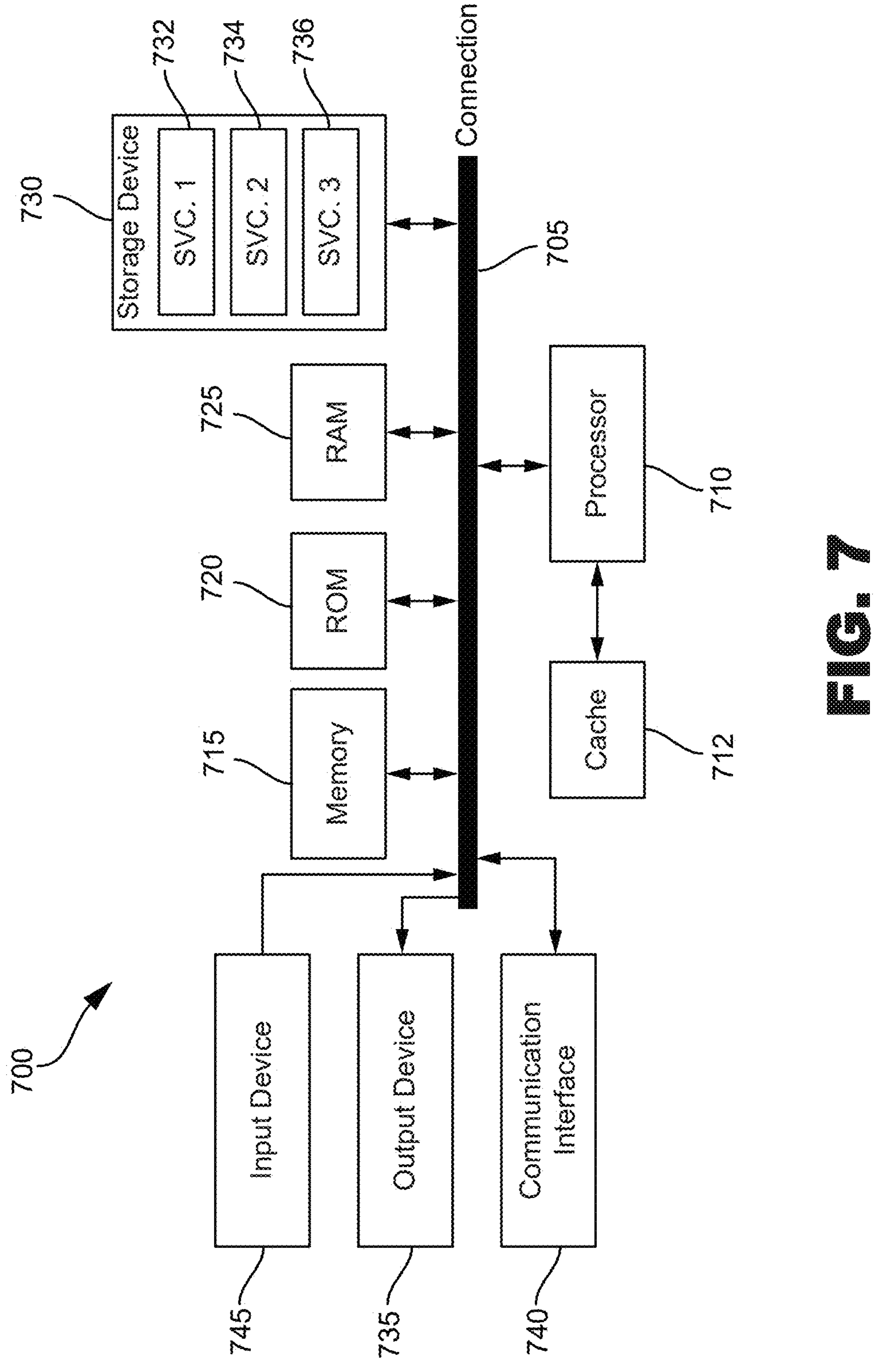
FIG. 7 illustrates an example computing device architecture which can be employed to perform various steps, methods, and techniques disclosed herein.

FIG. 7 illustrates an example computing device architecture 700 which can be employed to perform various steps, methods, and techniques disclosed herein. Specifically, the techniques described herein can be implemented, at least in part, through the computing device architecture 700 in an applicable computing device, such as logging tools 126. Further, the computing device can be configured to implement the techniques of determining fabrics of a geological sample using 3D segmentation and/or a rock image analysis using 3D segmentation as described herein (e.g., system 200, workflow 300, process 500, etc.). The various implementations will be apparent to those of ordinary skill in the art when practicing the present technology. Persons of ordinary skill in the art will also readily appreciate that other system implementations or examples are possible.

The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random-access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general-purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, or A and B and C. The language “at least one of” a set and/or “one or more” of a set does not limit the set to the items listed in the set. For example, claim language reciting “at least one of A and B” or “at least one of A or B” can mean A, B, or A and B, and can additionally include items not listed in the set of A and B.

Illustrative examples of the disclosure include:

Example 1. A system comprising: a memory; and one or more processors coupled to the memory, the one or more processors being configured to: receive three dimensional (3D) image of a geological sample; adjust an initial size of the 3D image of the geological sample to generate a resized 3D image of the geological sample; partition the resized 3D image of the geological sample into cubes; generate, for each cube, orthogonal planes based on a center of mass of each cube; extract, for the orthogonal planes associated with each cube, one or more features to represent texture of the geological sample; group the cubes into one or more clusters based on the one or more features; and construct a volume of the resized 3D image of the geological sample based on the one or more clusters for a texture analysis of the geological sample.

Example 2. The system of Example 1, adjusting the initial size of the 3D image of the geological sample is based on a linear interpolation prior to partitioning the 3D image into the one or more cubes.

Example 3. The system of Example 2, wherein the one or more processors are configured to: upscale the volume of the resized 3D image of the geological sample to correspond to the initial size of the 3D image of the geological sample.

Example 4. The system of any of Examples 1 to 3, wherein the one or more processors are configured to: apply a post-processing operation onto the constructed volume of the 3D image of the geological sample.

Example 5. The system of any of Examples 1 to 4, wherein the orthogonal planes comprise a sagittal plane, a coronal plane, and a transversal plane.

Example 6. The system of any of Examples 1 to 5, wherein the one or more features comprise an angular second moment, a contrast, a dissimilarity, and a homogeneity.

Example 7. The system of any of Examples 1 to 6, wherein the 3D image of the geological sample is partitioned into the cubes based on a sliding window technique using a predetermined stride.

Example 8. The system of any of Examples 1 to 7, wherein the one or more features are extracted based on a gray-level co-occurrence matrix.

Example 9. The system of any of Examples 1 to 8, wherein grouping the cubes into the one or more clusters based on the one or more features comprises identifying a pattern using a clustering algorithm based on the one or more features that are extracted for the orthogonal planes associated with each cube.

Example 10. The system of any of Examples 1 to 9, wherein the geological sample is a rock sample.

Example 11. A method comprising: receiving three dimensional (3D) image of a geological sample; adjusting an initial size of the 3D image of the geological sample to generate a resized 3D image of the geological sample; partitioning the resized 3D image of the geological sample into cubes; generating, for each cube, orthogonal planes based on a center of mass of each cube; extracting, for the orthogonal planes associated with each cube, one or more features to represent texture of the geological sample; grouping the cubes into one or more clusters based on the one or more features; and constructing a volume of the resized 3D image of the geological sample based on the one or more clusters for a texture analysis of the geological sample.

Example 12. The method of Example 11, wherein adjusting the initial size of the 3D image of the geological sample is based on a linear interpolation prior to partitioning the 3D image into the one or more cubes.

Example 13. The method of Example 12, further comprising: upscaling the volume of the resized 3D image of the geological sample to correspond to the initial size of the 3D image of the geological sample.

Example 14. The method of any of Examples 11 to 13, further comprising: applying a post-processing operation onto the constructed volume of the 3D image of the geological sample.

Example 15. The method of any of Examples 11 to 14, wherein the orthogonal planes comprise a sagittal plane, a coronal plane, and a transversal plane.

Example 16. The method of any of Examples 11 to 15, wherein the one or more features comprise an angular second moment, a contrast, a dissimilarity, and a homogeneity.

Example 17. The method of any of Examples 11 to 16, wherein the 3D image of the geological sample is partitioned into the cubes based on a sliding window technique using a predetermined stride.

Example 18. The method of any of Examples 11 to 17, wherein the one or more features are extracted based on a gray-level co-occurrence matrix.

Example 19. The method of any of Examples 11 to 18, wherein grouping the cubes into the one or more clusters based on the one or more features comprises identifying a pattern using a clustering algorithm based on the one or more features that are extracted for the orthogonal planes associated with each cube.

Example 20. A non-transitory computer-readable medium having stored thereon instructions which, when executed by one or more processors, cause the one or more processors to perform a method according to any of Examples 11 to 19.

Example 21. A system comprising means for performing a method according to any of Examples 11 to 19.

Example 22. A computer-program product having stored thereon instructions which, when executed by one or more processors, cause the one or more processors to perform a method according to any of Examples 11 to 19.

What is claimed is:

1. A system comprising:

a memory; and one or more processors coupled to the memory, the one or more processors being configured to:

receive three dimensional (3D) image of a geological sample;

adjust an initial size of the 3D image of the geological sample to generate a resized 3D image of the geological sample;

partition the resized 3D image of the geological sample into cubes;

determine a center of mass for each cube and assign a label to each center of mass of each cube;

generate, for each cube, orthogonal planes based on the determined center of mass of each cube;

extract, for the orthogonal planes associated with each cube, one or more features to represent texture of the geological sample;

group the cubes into one or more clusters based on the one or more features; and construct a volume of the resized 3D image of the geological sample based on the one or more clusters for a texture analysis of the geological sample.

2. The system of claim 1, adjusting the initial size of the 3D image of the geological sample is based on a linear interpolation prior to partitioning the 3D image into the one or more cubes.

3. The system of claim 2, wherein the one or more processors are configured to:

upscale the volume of the resized 3D image of the geological sample to correspond to the initial size of the 3D image of the geological sample.

4. The system of claim 1, wherein the one or more processors are configured to:

apply a post-processing operation onto the constructed volume of the 3D image of the geological sample.

5. The system of claim 1, wherein the orthogonal planes comprise a sagittal plane, a coronal plane, and a transversal plane.

6. The system of claim 1, wherein the one or more features comprise an angular second moment, a contrast, a dissimilarity, and a homogeneity.

7. The system of claim 1, wherein the 3D image of the geological sample is partitioned into the cubes based on a sliding window technique using a predetermined stride.

8. The system of claim 1, wherein the one or more features are extracted based on a gray-level co-occurrence matrix.

9. The system of claim 1, wherein grouping the cubes into the one or more clusters based on the one or more features comprises identifying a pattern using a clustering algorithm based on the one or more features that are extracted for the orthogonal planes associated with each cube.

10. The system of claim 1, wherein the geological sample is a rock sample.

11. A method comprising:

receiving three dimensional (3D) image of a geological sample;

adjusting an initial size of the 3D image of the geological sample to generate a resized 3D image of the geological sample;

partitioning the resized 3D image of the geological sample into cubes;

determining a center of mass for each cube and assign a label to each center of mass of each cube;

generating, for each cube, orthogonal planes based on the determined center of mass of each cube;

extracting, for the orthogonal planes associated with each cube, one or more features to represent texture of the geological sample;

grouping the cubes into one or more clusters based on the one or more features; and constructing a volume of the resized 3D image of the geological sample based on the one or more clusters for a texture analysis of the geological sample.

12. The method of claim 11, wherein adjusting the initial size of the 3D image of the geological sample is based on a linear interpolation prior to partitioning the 3D image into the one or more cubes.

13. The method of claim 12, further comprising:

upscaling the volume of the resized 3D image of the geological sample to correspond to the initial size of the 3D image of the geological sample.

14. The method of claim 11, further comprising:

applying a post-processing operation onto the constructed volume of the 3D image of the geological sample.

15. The method of claim 11, wherein the orthogonal planes comprise a sagittal plane, a coronal plane, and a transversal plane.

16. The method of claim 11, wherein the one or more features comprise an angular second moment, a contrast, a dissimilarity, and a homogeneity.

17. The method of claim 11, wherein the 3D image of the geological sample is partitioned into the cubes based on a sliding window technique using a predetermined stride.

18. The method of claim 11, wherein the one or more features are extracted based on a gray-level co-occurrence matrix.

19. The method of claim 11, wherein grouping the cubes into the one or more clusters based on the one or more features comprises identifying a pattern using a clustering algorithm based on the one or more features that are extracted for the orthogonal planes associated with each cube.

20. A non-transitory computer-readable medium having stored thereon instructions which, when executed by one or more processors, cause the one or more processors to:

receive three dimensional (3D) image of a geological sample;

adjust an initial size of the 3D image of the geological sample to generate a resized 3D image of the geological sample;

partition the resized 3D image of the geological sample into cubes;

determine a center of mass for each cube and assign a label to each center of mass of each cube;

generate, for each cube, orthogonal planes based on the determined center of mass of each cube;

extract, for the orthogonal planes associated with each cube, one or more features to represent texture of the geological sample;

group the cubes into one or more clusters based on the one or more features; and construct a volume of the resized 3D image of the geological sample based on the one or more clusters for a texture analysis of the geological sample.

* * * * *